(No Model.)
F. S. CHANEY.
WRENCH.
No. 451,396. Patented Apr. 28, 1891.
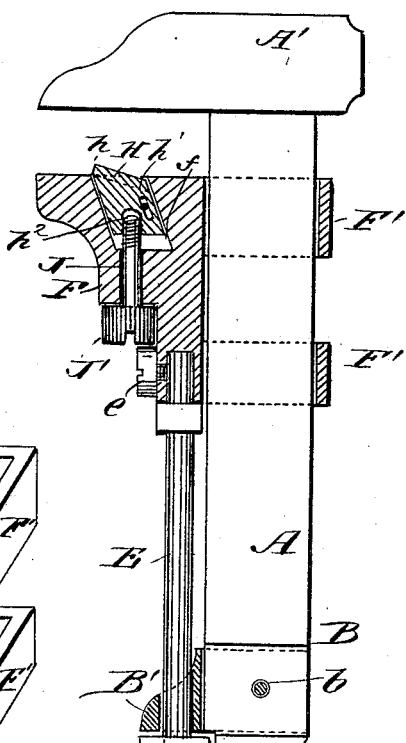
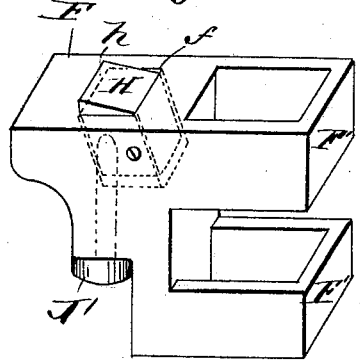
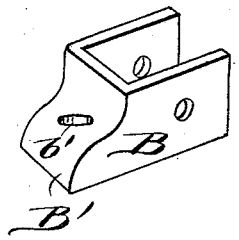
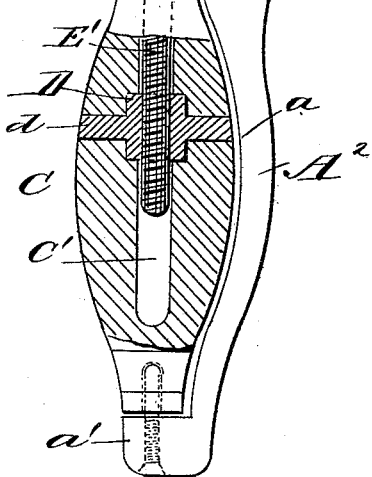
WITNESSES:
F. McArdle,
C. Sedgwick
INVENTOR:
F. S. Chaney
BY Munn & Co.
ATTORNEYS

UNITED STATES PATENT OFFICE.

FRANK STACEY CHANEY, OF HONOLULU, HAWAII, ASSIGNOR OF ONE-HALF TO JOHN FRED HAGLUND, OF SAME PLACE.

WRENCH.

SPECIFICATION forming part of Letters Patent No. 451,396, dated April 28, 1891.

Application filed November 14, 1890. Serial No. 371,420. (No model.)

*To all whom it may concern:*

Be it known that I, FRANK STACEY CHANEY, of Honolulu, Hawaiian Islands, have invented a new and Improved Wrench, of which the following is a full, clear, and exact description.

My invention relates to improvements in wrenches; and the object of my invention is to produce a strong and simple wrench which may be easily applied to various kinds of nuts, and which is specially adapted to start nuts which stick closely to the bolts or have become rusted.

To this end my invention consists in a wrench constructed substantially as hereinafter described and claimed.

Reference is to be had to the accompanying drawings, forming a part of this specification, in which similar letters of reference indicate corresponding parts in all the figures.

Figure 1 is a longitudinal section of the wrench embodying my invention. Fig. 2 is a detail perspective view of the movable jaw. Fig. 3 is a detail perspective view of the stay-block, and Fig. 4 is a detail perspective view of the nut which is held in the handle of the wrench.

The wrench has a long shank A, which comprises the body of the wrench and which terminates at one end in a fixed jaw A', and which at the other end is thin and shaped to fit the hand, as shown at $A^2$, the handle portion being cut away, as shown at $a$, so that the movable handle may be conveniently attached. The wrench-shank is also thickened at its extreme end, as shown at $a'$, to adapt it to receive the movable handle.

A stay-block B is fixed to the shank A at a point adjacent to the handle portion of the shank, the block having wings adapted to be easily slipped upon the shank into recesses therein and having a projecting side B', adapted to abut with the end of the movable handle C, and through this portion B' is a hole $b'$ to receive the wrench-bolt, as described below. The handle C is shaped to fit the hand, and is pivoted in the handle portion $A^2$ of the shank A, between the stay-block B and the thickened end $a'$ of the shank, the handle C having a central bore C', extending through nearly its entire length. A nut D is fixed centrally in the handle C, the said nut having projecting flanges $d$, which are embedded in the handle C, and which thus prevent the nut from turning loosely in the handle. The handle is made in two pieces, so that the nut may be conveniently placed therein.

The bolt E extends parallel with the shank A and through the hole $b'$ of the stay-block B' into the bore C' of the handle C, the end of the bolt next the handle being provided with a screw-thread E', which fits the nut D. The opposite end of the bolt E enters the movable jaw F, and is fixed thereto by means of a set-screw $e$. The movable jaw F is adapted to slide on the shank A, and to enable it to slide easily and yet have sufficient strength it is provided with two straps F', which extend around the shank.

The jaw F has an inclined recess $f$ in its bearing-face, and mounted in the recess is a pawl H, adapted to project from the face of the jaw and having an inclined outer surface which terminates near its front side in an edge $h$. The pawl H is also provided with a slot $h'$, through which extends a small pin, which serves to prevent the removal of the pawl, but which allows it to slide in the recess $f$. In the inner end of the pawl H is a screw-threaded perforation $h^2$, in which fits the screw J, said screw being made to extend through a portion of the jaw F, and the screw terminates at its outer end in a thumb-piece J', by means of which it may be turned, the said thumb-piece being arranged so as to rest upon the head of the set-screw $e$, which thus prevents the removal of the screw J.

The wrench is operated to a certain extent like an ordinary monkey-wrench—that is to say, the jaws A' and F are adjusted to a nut, and the wrench is then turned, and to adjust the jaw F the handle C is turned, thus causing the screw-bolt E to move longitudinally in the nut D, and the motion is transmitted to the jaw F. When a rusted nut or one which sticks is to be started, an incision is made in the side of the nut, and the thumb-piece J' is turned so as to force the edge $h$ of the pawl H into the incision, and the wrench is then turned in the usual way, and it will thus be seen that the pawl will prevent the wrench from slipping off of the nut and rounding the corners of the same.

Having thus described my invention, I claim as new and desire to secure by Letters Patent—

1. A wrench comprising a fixed jaw having a laterally-extending shank which terminates in a handle, a movable jaw mounted on the shank of the fixed jaw, a screw-bolt extending from the movable jaw into the handle, and a revoluble nut mounted on the handle and adapted to receive the screw-bolt, substantially as described.

2. In a wrench, the combination of the fixed jaw having the laterally-extending shank, the revoluble hollow handle connected with the shank, the nut mounted in the handle, the movable jaw slidably mounted on the fixed jaw-shank, and the screw-bolt extending from the movable jaw into the nut, substantially as described.

3. A wrench comprising a fixed jaw having a laterally-extending shank, a stay-block fixed to the end of the shank, a hollow handle pivoted to the stay-block, a movable jaw mounted on the fixed jaw-shank, and a screw-bolt connecting the movable jaw with a nut in the handle, substantially as described.

4. A wrench comprising a fixed and a movable jaw, means for adjusting the jaws, and a pawl mounted in a recess in one of the jaws so as to project from the face of the same, substantially as described.

5. The combination, with a wrench having two jaws, of a pawl mounted in a recess of one jaw so as to project from the face of the same, substantially as described.

6. The combination, with a wrench having two jaws, of a pawl mounted in a recess of one of the jaws so as to project from the face of the same, and a screw mechanism for adjusting the pawl, substantially as described.

7. The combination, with the jaws, one of which is recessed as shown, of a pawl mounted in the recess so as to move at an angle to the jaw-face, and a thumb-screw mounted in the jaw and connecting with the pawl, substantially as described.

8. The combination, with the recessed jaw, of the pawl mounted to slide in the recess and provided at its inner end with a threaded hole, and a thumb-screw mounted in the jaw with its threaded end in position to enter the threaded hole of the pawl, substantially as described.

FRANK STACEY CHANEY.

Witnesses:
 FRANK BROWN,
 M. GOLDBERG.